(12) United States Patent
Okubo et al.

(10) Patent No.: US 10,316,382 B2
(45) Date of Patent: Jun. 11, 2019

(54) METHOD FOR PRODUCING NON-ORIENTED ELECTRICAL STEEL SHEETS

(71) Applicant: JFE STEEL CORPORATION, Tokyo (JP)

(72) Inventors: Tomoyuki Okubo, Tokyo (JP); Kohei Kurihara, Tokyo (JP); Yoshihiko Oda, Tokyo (JP); Hiroaki Nakajima, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 15/552,755

(22) PCT Filed: Dec. 11, 2015

(86) PCT No.: PCT/JP2015/084765
§ 371 (c)(1),
(2) Date: Aug. 22, 2017

(87) PCT Pub. No.: WO2016/136095
PCT Pub. Date: Sep. 1, 2016

(65) Prior Publication Data
US 2018/0030558 A1  Feb. 1, 2018

(30) Foreign Application Priority Data
Feb. 24, 2015 (JP) .................................. 2015-033646

(51) Int. Cl.
| | | |
|---|---|---|
| C21D 8/12 | (2006.01) | |
| C21D 9/46 | (2006.01) | |
| C22C 38/00 | (2006.01) | |
| C22C 38/58 | (2006.01) | |
| C22C 38/60 | (2006.01) | |
| H01F 1/16 | (2006.01) | |
| C22C 38/02 | (2006.01) | |
| C22C 38/04 | (2006.01) | |
| C22C 38/06 | (2006.01) | |
| H01F 1/147 | (2006.01) | |
| C21D 1/34 | (2006.01) | |
| C21D 1/42 | (2006.01) | |

(52) U.S. Cl.
CPC .................. *C21D 8/12* (2013.01); *C21D 1/34* (2013.01); *C21D 1/42* (2013.01); *C21D 8/1272* (2013.01); *C21D 9/46* (2013.01); *C22C 38/00* (2013.01); *C22C 38/001* (2013.01); *C22C 38/002* (2013.01); *C22C 38/004* (2013.01); *C22C 38/008* (2013.01); *C22C 38/02* (2013.01); *C22C 38/04* (2013.01); *C22C 38/06* (2013.01); *C22C 38/58* (2013.01); *C22C 38/60* (2013.01); *H01F 1/14775* (2013.01); *H01F 1/16* (2013.01)

(58) Field of Classification Search
CPC ........................................................ H01F 1/16
See application file for complete search history.

(56) References Cited

U.S. PATENT DOCUMENTS

| | | |
|---|---|---|
| 4,560,423 A | 12/1985 | Shimoyama et al. |
| 4,661,174 A | 4/1987 | Miyoshi et al. |
| 4,898,626 A | 2/1990 | Shoen et al. |
| 4,898,627 A | 2/1990 | Schoen et al. |
| 5,421,912 A | 6/1995 | Kumano et al. |
| 2007/0062611 A1 | 3/2007 | Murakami |
| 2013/0263981 A1 | 10/2013 | Zaizen et al. |
| 2014/0345751 A1 | 11/2014 | Oda et al. |
| 2015/0059929 A1 | 3/2015 | Zaizen et al. |
| 2015/0187475 A1 | 7/2015 | Zaizen et al. |
| 2016/0042850 A1 | 2/2016 | Oda et al. |
| 2016/0273064 A1 | 9/2016 | Kataoka et al. |

FOREIGN PATENT DOCUMENTS

| | | |
|---|---|---|
| CA | 2821087 A1 | 6/2012 |
| CN | 103827333 A | 5/2014 |
| CN | 104046760 A | 9/2014 |
| CN | 104136637 A | 11/2014 |
| EP | 2657355 A1 | 10/2013 |
| JP | 01290716 A | 11/1989 |
| JP | 0211728 A | 1/1990 |

(Continued)

OTHER PUBLICATIONS

Extended European Search Report for European Application No. 15883385.5, dated Dec. 12, 2017, 8 pages.
International Search Report and Written Opinion for International Application No. PCT/JP2015/084765, dated Mar. 8, 2016—6 Pages.
Japanese Office Action with Concise Statement of Relevance for Japanese Application No. JP2016/513926, dated Mar. 3, 2017—4 Pages.
Taiwanese Office Action with Search Report for Taiwanese Application No. 104142866, dated Oct. 3, 2016—5 Pages.
Non Final Office Action for U.S. Appl. No. 14/761,538, dated Dec. 19, 2016, 10 pages.
Final Office Action for U.S. Appl. No. 14/761,538, dated Jul. 14, 2017, 13 pages.

(Continued)

*Primary Examiner* — Jessee R Roe
*Assistant Examiner* — Jophy S. Koshy
(74) *Attorney, Agent, or Firm* — RatnerPrestia

(57) ABSTRACT

In the production of a non-oriented electrical stress sheet by hot rolling a steel slab containing, by mass %, C: not more than 0.005%, Si: not more than 8.0%, Mn: 0.03-3.0%, P: not more than 0.2%, S: not more than 0.005%, Al: not more than 3.0%, N: not more than 0.005%, Ni: not more than 3%, Cr: not more than 5%, Ti: not more than 0.005%, Nb: not more than 0.003%, As: not more than 0.005% and O: not more than 0.005%, subjecting to one cold rolling or two or more cold rollings interposing an intermediate annealing therebetween after conducting a hot band annealing or without conducting a hot band annealing and subjecting to a finish annealing, an average heating rate from 600° C. to 700° C. during the heating process in the finish annealing is set to not less than 50° C./sec.

8 Claims, 2 Drawing Sheets

(56) References Cited

FOREIGN PATENT DOCUMENTS

| | | |
|---|---|---|
| JP | H10251754 A | 9/1998 |
| JP | 2007217744 A | 8/2007 |
| JP | 2013010982 A | 1/2013 |
| JP | 2013044012 A | 3/2013 |
| JP | 2014173099 A | 9/2014 |
| JP | 2014198896 A | 10/2014 |
| KR | 20130101092 A | 9/2013 |
| RU | 2534638 C1 | 12/2014 |
| SU | 817081 A1 | 3/1981 |
| TW | 201207121 A | 2/2012 |
| WO | WO-9308313 A1 * | 4/1993 ............. C22C 38/02 |
| WO | 2012086534 A1 | 6/2012 |
| WO | WO-2013046661 A1 * | 4/2013 ............. C22C 38/60 |
| WO | 2014030512 A1 | 2/2014 |
| WO | 2014142100 A1 | 9/2014 |

OTHER PUBLICATIONS

Chinese Office Action for Chinese Application No. 201580075482.X, dated Mar. 14, 2018, including English translation, 11 pages.

Russian Office Action for Russian Application No. 2017131714, dated Jul. 23, 2018, with translation, 8 pages.

Korean Office Action for Korean Application No. 2017-7023384, with Concise Statement of Relevance of Office Action, dated Nov. 8, 2018—10 pages.

* cited by examiner

METHOD FOR PRODUCING NON-ORIENTED ELECTRICAL STEEL SHEETS

CROSS REFERENCE TO RELATED APPLICATIONS

This is the U.S. National Phase application of PCT/JP2015/084765, filed Dec. 11, 2015, which claims priority to Japanese Patent Application No. 2015-033646, filed Feb. 24, 2015, the disclosures of each of these applications being incorporated herein by reference in their entireties for all purposes.

TECHNICAL FIELD OF THE INVENTION

This invention relates to a method for producing a non-oriented electrical steel sheet, and more particularly to a method for producing a non-oriented electrical steel sheet having a high magnetic flux density.

BACKGROUND OF THE INVENTION

In recent years, energy saving has been promoted from a viewpoint of protecting the global environment, and high efficiency and downsizing are also positively directed in the field of electric instruments. Therefore, a non-oriented electrical steel sheet widely used as an iron core material for the electric instrument has been strongly desired to have a high magnetic flux density and a low iron loss.

In order to increase the magnetic flux density in the non-oriented electrical steel sheet, it is effective to improve a texture of a product sheet by decreasing {111} orientation grains and/or increasing {110} or {100} orientation grains. In the conventional production of the non-oriented electrical sheet, therefore, a crystal grain size before a cold rolling is increased, or cold rolling reduction is rationalized.

Another means for improving the texture is a technique of increasing a heating rate in recrystallization annealing. This technique is often used in the production of grain-oriented electrical steel sheets and utilizes the fact that an iron loss is improved by increasing the heating rate in decarburization annealing (primary recrystallization annealing) to increase {110} orientation grains in the steel sheet after the decarburization annealing and refine the structure of the steel sheet after secondary recrystallization (for example, see Patent Document 1). Similarly, a technique for increasing the magnetic flux density by increasing a heating rate in a finish annealing to change the texture in the non-oriented electrical steel sheet is proposed (for example, see Patent Document 2).

PATENT DOCUMENTS

Patent Document 1: JP-A-H01-290716
Patent Document 2: JP-A-H02-011728

SUMMARY OF THE INVENTION

However, the technique disclosed in Patent Document 1 relates to a grain-oriented electrical steel sheet and cannot be applied to a non-oriented electrical steel sheet as it is. Also, as a result of studying the technique disclosed in Patent Document 2, the inventors have found out that an effect of stably increasing the magnetic flux density cannot be obtained by this technique.

The invention is made in view of the above problems inherent to the conventional techniques, and an object thereof is to propose a method for producing a non-oriented electrical steel sheet capable of stably attaining a higher magnetic flux density even when a rapid heating is conducted in the finish annealing for the purpose of improving the texture.

The inventors have made various studies focusing on the influence of minor ingredients contained in steel for solving the above task. As a result, they have found out that a non-oriented electrical steel sheet having a high magnetic flux density can be stably obtained by limiting minor ingredients contained in a raw steel material (slab), especially Ti, Nb and As to a very slight amount, and the invention has been accomplished.

That is, the invention includes a method for producing a non-oriented electrical steel sheet by hot rolling a steel slab having a chemical composition comprising C: not more than 0.005 mass %, Si: not more than 8.0 mass %, Mn: 0.03-3.0 mass %, P: not more than 0.2 mass %, S: not more than 0.005 mass %, Al: not more than 3.0 mass %, N: not more than 0.005 mass %, Ni: not more than 3 mass %, Cr: not more than 5 mass %, Ti: not more than 0.005 mass %, Nb: not more than 0.003 mass %, As: not more than 0.005 mass %, O: not more than 0.005 mass % and the remainder being Fe and inevitable impurities, subjecting to one cold rolling or two or more cold rollings interposing an intermediate annealing therebetween after a hot band annealing or without a hot band annealing, and further to a finish annealing, characterized in that an average heating rate from 600° C. to 700° C. during the heating process in the finish annealing is set to not less than 50° C./sec.

The method for producing a non-oriented electrical steel sheet according to an embodiment of the invention is characterized in that the heating process in the finish annealing is conducted by heating through induction heating and then radiation heating to set an average heating rate from 700° C. to 760° C. to not less than 5° C./sec.

Also, the method for producing a non-oriented electrical steel sheet according to an embodiment of the invention is characterized in that a ferrite grain size before a final cold rolling in the cold rolling is set to not more than 70 μm.

The steel slab used in the method for producing a non-oriented electrical steel sheet according an embodiment of to the invention is characterized by containing one or two of Sn and Sb each in an amount of 0.005-0.20 mass % in addition to the above chemical composition.

Moreover, the steel slab used in method for producing a non-oriented electrical steel sheet according to an embodiment of the invention is characterized by containing one or more selected from Ca, Mg, and REM each in an amount of 0.0001-0.010 mass % in addition to the above chemical composition.

According to the invention, it is possible to stably produce a non-oriented electrical steel sheet having a high magnetic flux density even when a rapid heating is conducted in the finish annealing.

DETAILED DESCRIPTION OF EMBODIMENTS OF THE INVENTION

There will be described an example of experiments building a momentum for developing the invention.

Experiment 1

A steel containing C: 0.0021 mass %, Si: 1.01 mass %, Mn: 0.29 mass %, P: 0.06 mass %, S: 0.0012 mass %, Al: 0.0005 mass %, N: 0.0016 mass %, Ni: 0.01 mass %, Cr: 0.01 mass %, Ti: 0.0012 mass %, Nb: 0.0004 mass % and O: 0.0018 mass % and added with As varying within a range of 0.001-0.01 mass % is laboratorially melted in a vacuum furnace to form a steel ingot. The steel ingot is then hot rolled to form a hot rolled sheet having a sheet thickness of 2.4 mm. As a result of the examination on the structure of the hot rolled steel sheet, it is found out that the structure is completely recrystallized and has a ferrite grain size of 18-22 μm.

Next, the hot rolled sheet is pickled and cold rolled to form a cold rolled sheet having a sheet thickness of 0.35 mm. The cold rolled sheet is then subjected to a finish annealing at a soaking temperature of 900° C. for a soaking time of 10 seconds. In this case, the heating up to 740° C. in the finish annealing is performed by using a solenoid type induction heating device, wherein an average heating rate from the room temperature to 400° C. is set to 20° C./sec and an average heating rate from 400° C. to 700° C. is varied within a range of 20-400° C./sec. Furthermore, the heating from the completion of the induction heating to 900° C. (soaking temperature) is performed by using an electric furnace (radiation heating furnace), wherein an output of the electric furnace is controlled so that an average heating rate from 700° C. to 760° C. is set to 15° C./sec and an average heating rate of a temperature higher than 760° C. is set to 10° C./sec. An atmosphere in the finish annealing is set to have a ratio by vol % of $H_2:N_2=2:8$ and a dew point of −20° C. ($P_{H2O}/P_{H2}=0.006$).

Next, from the finish annealed sheet thus obtained are taken out test specimens of 180 mm×30 mm in a rolling direction (L direction) and in a widthwise direction (C direction) as a longitudinal direction and magnetic properties (magnetic flux density $B_{50}$) thereof are measured by an Epstein test in accordance with JIS C2550-1 (2011).

Figure 1:
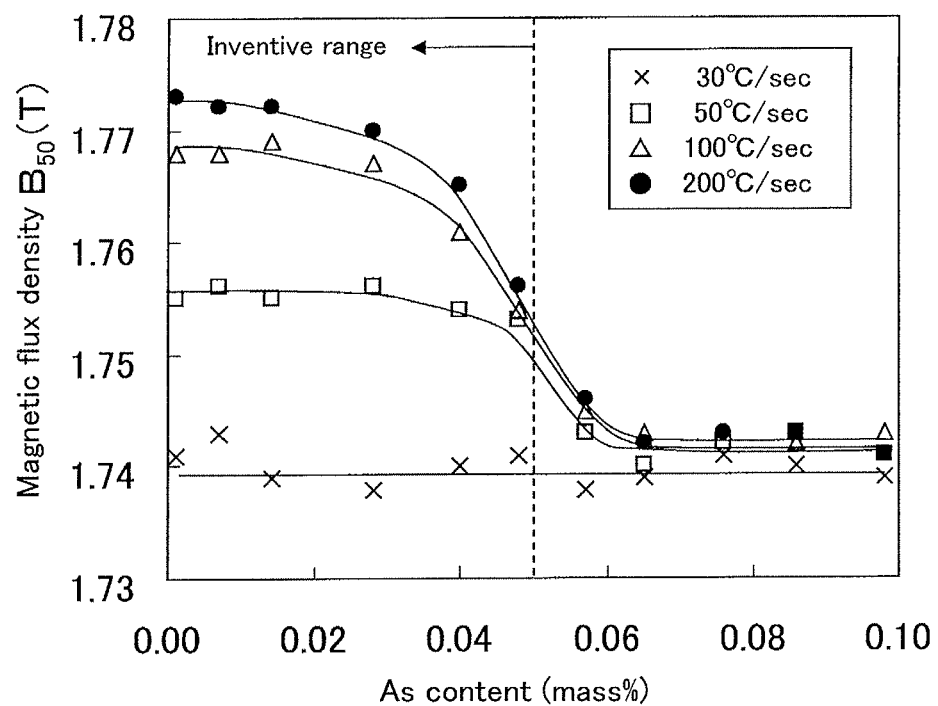
FIG. 1 is a graph showing an influence of an average heating rate from 600° C. to 700° C. and As content upon a magnetic flux density $B_{50}$.

FIG. 1 shows an influence of an average heating rate from 600° C. to 700° C. and As content upon the magnetic flux density $B_{50}$. As seen from this figure, the magnetic flux density $B_{50}$ is increased when As content is not more than 0.005 mass % and the average heating rate is not less than 50° C./sec.

In order to investigate the cause thereof, the inventors have studied the textures of the test specimens and found that the test specimen having a high magnetic flux density is low in {111} strength. As seen from this result, As as a minor ingredient is a harmful element increasing a ratio of {111} orientation grains to decrease the magnetic flux density, and hence it is necessary to limit As content incorporated as an impurity to not more than 0.005 mass % for stably obtaining an effect of increasing the magnetic flux density by the rapid heating.

The above experiment is conducted for studying an influence of As content as a minor ingredient. Further, the inventors have conducted a similar experiment on other minor ingredients to investigate an influence on {111} strength after the finish annealing. As a result, it has been found that Ti and Nb are harmful elements badly affecting the magnetic flux density like As and are necessary to be limited to be not more than 0.005 mass % and not more than 0.003 mass %, respectively.

As the reason why Ti, Nb and As have influences on {111} strength after the finish annealing, the inventors consider as follows:

Ti, Nb and As are elements delaying the recovery and recrystallization in the finish annealing. Since {111} orientation grains being fast in the recrystallization are hardly influenced therefrom, if a large amount of the harmful elements are contained, the superiority of {111} orientation grains to {110} and/or {100} orientation grains becomes relatively high. Therefore, the formation of {111} orientation grains cannot be suppressed even when the heating rate is increased, so that the effect of increasing the magnetic flux density through the rapid heating cannot be obtained.

As seen from the results of the experiment, it is necessary to use a raw steel material of high purity by decreasing Ti, Nb and As to very slight amounts in order to stably obtain a higher magnetic flux density when the rapid heating is conducted in the finish annealing.

Experiment 2

The inventors have studied a heating pattern in the finish annealing.

A steel having a chemical composition containing C: 0.0023 mass %, Si: 0.95 mass %, Mn: 0.23 mass %, P: 0.04 mass %, S: 0.0014 mass %, Al: 0.0001 mass %, N: 0.0021 mass %, Ni: 0.01 mass %, Cr: 0.02 mass %, Ti: 0.0008 mass %, Nb: 0.0004 mass %, As: 0.001 mass % and O: 0.0031 mass % is melted in a vacuum furnace to form a steel ingot. The steel ingot is then hot rolled to form a hot rolled sheet having a sheet thickness of 1.8 mm. As a result of studying the structure of the hot rolled steel sheet, it is completely recrystallized and has a ferrite grain size of 20-30 μm.

Figure 2:
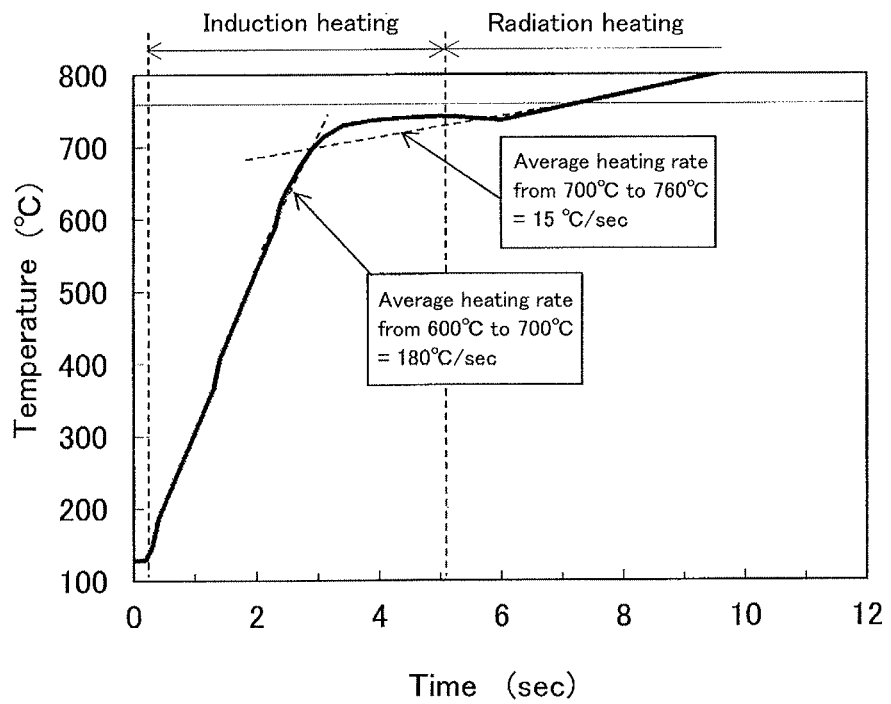
FIG. 2 is a diagram explaining a method of determining an average heating rate from 600° C. to 700° C. and from 700° C. to 760° C.

Next, the hot rolled sheet is pickled and cold rolled to provide a cold rolled sheet having a sheet thickness of 0.30 mm, which is subjected to a finish annealing. The finish annealing is conducted in an experimental furnace combined with a solenoid type induction heating furnace and an electric furnace (radiation heating furnace), wherein an average heating rate from 700° C. to 760° C. is variously changed. In this regard, the method of determining the average heating rate from 700° C. to 760° C. is shown in FIG. 2. The temperature reached by the induction heating is 740° C. Also, the atmosphere in the finish annealing has a ratio by vol % of $H_2:N_2=2:8$ and a dew point of −20° C. ($P_{H2O}/P_{H2}=0.006$).

Figure 3:
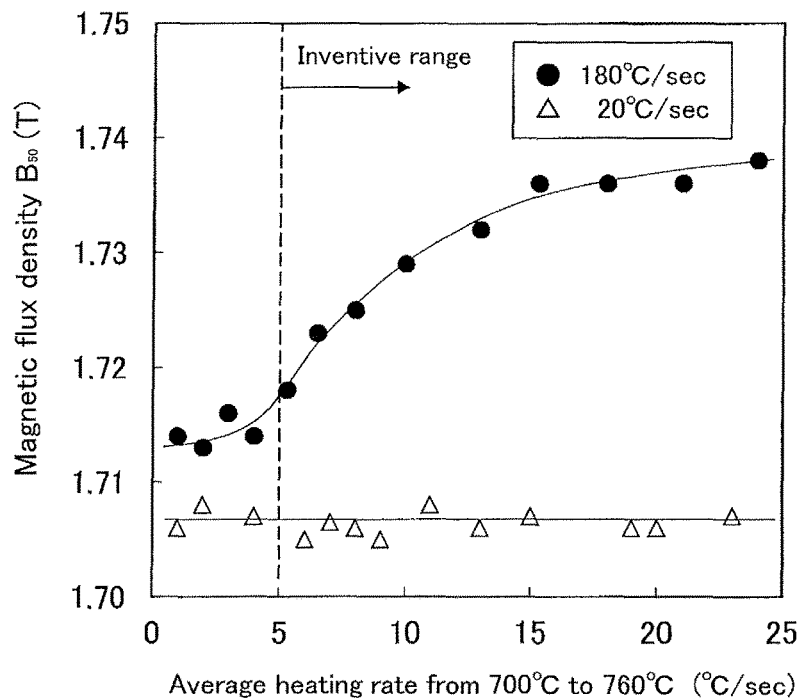
FIG. 3 is a graph showing an influence of an average heating rate from 700° C. to 760° C. upon a magnetic flux density $B_{50}$.

Next, from the finish annealed sheet thus obtained are taken out test specimens of 180 mm×30 mm in L direction and C direction as a longitudinal direction to measure magnetic properties (magnetic flux density $B_{50}$) by an Epstein test in accordance with JIS C2550-1 (2011). FIG. 3 shows an influence of the average heating rate from 700° C. to 760° C. upon the magnetic flux density $B_{50}$. As seen from this figure, the effect of increasing the magnetic flux density $B_{50}$ can be obtained by setting the average heating rate from 700° C. to 760° C. to not less than 5° C./sec.

As seen from the results of the above experiment, it is effective to increase the average heating rate from 700° C.

to 760° C. by conducting strong heating through the radiation heating subsequent to rapid heating through the induction heating in order to stably obtain the effect of increasing the magnetic flux density in the finish annealing combined with the induction heating and the radiation heating.

The inventors have considered the reason thereof as follow.

In the steel sheet rapidly heated up to 700° C. in a short time by the induction heating, recrystallization is not completed at the completion of the induction heating. Since a heating efficiency is rapidly decreased at a temperature of not lower than 700° C. by the solenoid type induction heating, {111} orientation grains having a high recrystallization rate are easily formed if a heating rate at a temperature higher than 700° C. is low. Therefore, in order to prevent the recrystallization of {111} orientation grains, it is considered that recrystallization is necessary to be promoted at a temperature as high as possible by further conducting strong heating at a temperature exceeding 700° C.

The chemical composition of the raw steel material (slab) used in the production of the non-oriented electrical steel sheet according to embodiments of the invention will be explained below.

C: not more than 0.005 mass %

C is an element causing magnetic aging to form carbides to thereby deteriorate an iron loss property, so that it is limited to not more than 0.005 mass % in the invention. It is preferably not more than 0.003 mass %. Moreover, the lower limit is not particularly defined, but it is preferable to about 0.0001 mass % from a viewpoint of suppressing the decarburization cost.

Si: not more than 8.0 mass %

Si is an element effective for increasing a specific resistance of steel to decrease an iron loss, and is preferable to be added in an amount of not less than 1.0 mass %. However, an addition exceeding 8.0 mass % makes it difficult to produce steel by rolling, so that the upper limit is set to about 8.0 mass %. It is preferably not more than 4.0 mass % from a viewpoint of the productivity. When Si content is high, the magnetic flux density is decreased, so that it is preferable to be not more than 2.0 mass % for obtaining a high magnetic flux density.

Mn: 0.03-3.0 mass %

Mn has not only an effect of fixing S to prevent hot brittleness but also an effect of increasing a specific resistance of steel to decrease an iron loss. In order to obtain the above effects, it is necessary to be added in an amount of not less than 0.03 mass %. When it exceeds 3.0 mass %, however, the decrease of the magnetic flux density becomes prominent. Therefore, Mn is a range of 0.03-3.0 mass %. Preferably, it is a range of 0.05-1.0 mass %.

P: not more than 0.2 mass %

P is an element used for controlling the strength of steel because a solid-solution strengthening ability is large. When the content exceeds 0.2 mass %, however, steel is embrittled and is hard to be rolled, so that the upper limit of P is set to 0.2 mass %. It is preferable to be not more than 0.1 mass %.

Al: not more than 3.0 mass %

Al has an effect of increasing a specific resistance of steel to decrease an iron loss like Si. However, when it exceeds 3.0 mass %, the rolling becomes difficult, so that the upper limit of Al is set to about 3.0 mass %.

In this regard, when Al content is more than 0.01 mass % but less than 0.1 mass %, fine AlN is precipitated to increase the iron loss, so that it is preferable to be not more than 0.01 mass % or in a range of 0.1-2.0 mass %. Moreover, when Al is decreased, the texture is improved to increase the magnetic flux density, so that Al is preferable to be not more than 0.01 mass % if it is intended to obtain the above effect.

S, N, O: not more than 0.005 mass % each

Each of S, N, and O is a harmful element forming fine precipitates to increase the iron loss. In particular, when the amount exceeds 0.005 mass %, the bad influence becomes prominent. Therefore, each of S, N and O is limited to not more than 0.005 mass %. More preferably, it is not more than 0.003 mass %.

Ni: not more than 3 mass %

Ni is an element added for adjusting the strength of steel. However, an addition exceeding 3 mass % brings about an increase of production cost, so that the upper limit of Ni is set to about 3 mass %. It is preferable to be not more than 1 mass %.

Cr: not more than 5 mass %

Cr is an element increasing the specific resistance of steel to decrease the iron loss. When the content exceeds 5 mass %, however, the iron loss property is adversely deteriorated, so that the upper limit of Cr is set to about 5 mass %. Preferably, it is not more than 2 mass %.

Ti: not more than 0.005 mass %, Nb: not more than 0.003 mass %

Ti and Nb are harmful elements delaying recovery and recrystallization in the finish annealing to increase {111} orientation grains after the finish annealing and lose an effect of increasing the magnetic flux density by the rapid heating. In particular, the above bad influence becomes prominent when Ti exceeds 0.005 mass % and Nb exceeds 0.003 mass %. Therefore, Ti and Nb are limited to not more than 0.005 mass % and not more than 0.003 mass %, respectively. Preferably, Ti is not more than 0.003 mass % and Nb is not more than 0.002 mass %.

As: not more than 0.005 mass %

As is a harmful element delaying recovery and recrystallization in the finish annealing to increase {111} orientation grains after the finish annealing and lose the effect of increasing the magnetic flux density by the rapid heating like Ti and Nb. In particular, the above bad influence becomes prominent when As exceeds 0.005 mass %. Therefore, As is limited to not more than 0.005 mass %. Preferably, it is not more than 0.003 mass %.

The slab used in the production of the non-oriented electrical steel sheet according to the invention can contain the following ingredients other than the aforementioned ingredients.

Sn, Sb: 0.005-0.20 mass % each

Each of Sn and Sb has an effect of improving recrystallization texture to improve the magnetic flux density and iron loss property. In order to obtain the above effect, each element is preferable to, be added in an amount of not less than 0.005 mass %. However, if each element is added in an amount exceeding 0.20 mass %, the above effect is saturated. Therefore, when at least one of Sn and Sb is added, each addition amount is preferable to be a range of 0.005-0.20 mass %.

Ca, Mg, REM: 0.0001-0.010 mass % each

Each of Ca, Mg and REM has an effect of forming stable sulfides and/or selenides to improve the grain growth of the crystal grains. In order to obtain the above effect, each element is preferable to be added in an amount of not less than 0.0001 mass %. When it is added in an amount exceeding 0.010 mass %, however, the iron loss property is adversely deteriorated. Therefore, when at least one of Ca, Mg and REM is added, each amount is preferable to be in a range of 0.0001-0.010 mass %.

Moreover, the remainder other than the above ingredients in the slab used in the production of the non-oriented electrical steel sheet according to an embodiment of the invention is Fe and inevitable impurities.

Next, the production method of the non-oriented electrical steel sheet according to an embodiment of the invention will be described below.

The non-oriented electrical steel sheet according to the invention can be produced by a method wherein steel is melted in a converter, an electric furnace or the like, adjusted to have the aforementioned chemical composition through a usual refining process of subjecting to a secondary refining in a degassing facility or the like, and shaped into a slab by a continuous casting method, which is hot rolled, cold rolled after a hot band annealing or without a hot band annealing and then subjected to a finish annealing.

The condition of the hot rolling is not particularly limited. However, from a viewpoint of increasing the magnetic properties, it is preferable that a finish rolling end temperature is in a range of 700-900° C. and a coiling temperature is in a range of 600-800° C. Also, the hot band annealing after the hot rolling may be conducted if required.

The hot rolled sheet after the hot rolling or the hot band annealing is shaped into a cold rolled sheet with a final thickness through one cold rolling or two or more cold rollings interposing an intermediate annealing therebetween.

In this regard, it is important in the invention that a ferrite grain size of the steel sheet before a final cold rolling of the cold rolling (in the case of the single cold rolling method, it is the cold rolling) is controlled to not more than 70 μm, preferably not more than 50 μm, more preferably not more than 40 μm.

In the recrystallization through the final annealing, recrystallized grains having a {111} orientation are formed from the neighborhood of grain boundaries in the texture before the final cold rolling, so that as the ferrite grain size of the texture before the final cold rolling is smaller, more {111} recrystallized grains are formed in the texture after the cold rolling and recrystallization, and an effect of decreasing {111} grains by the rapid heating becomes prominent. Thus, it is possible to perform process change such as decrease of the coiling temperature, decrease of hot band annealing temperature and the like, whereby merits such as improvement of shape, increase of production efficiency and the like can be obtained. Here, the ferrite grain size in the invention means an average crystal grain size measured by an intercept method with regard to the sheet thickness direction.

The control of the ferrite grain size can be performed by adjusting a finish rolling end temperature or a coiling temperature (self-annealing temperature) in the hot rolling, a hot band annealing temperature, an intermediate annealing temperature and so on. From a viewpoint of preventing ridging, it is preferable that the texture of the steel sheet before the final cold rolling has a recrystallization ratio of not less than 80%.

Next, the cold rolled sheet having a final thickness is subjected to a finish annealing to form a non-oriented electrical steel sheet.

In order to increase the magnetic flux density, an average heating rate from 600° C. to 700° C. in the heating process of the finish annealing is required to be not less than 50° C./sec, preferably not less than 100° C./sec. Moreover, the upper limit of the heating rate is not particularly defined, but is set to about 1000° C./sec from a viewpoint of reducing the installation cost.

It is necessary to use an electric heating or induction heating for obtaining a heating rate of not less than 50° C./sec. However, the electric heating causes surface defects and/or shape failure and thus is difficult in the application to the production of the non-oriented electrical steel sheet, so that the induction heating is preferably used.

After the end of the rapid heating, it is preferable to conduct the heating from 700° C. to 760° C. at an average heating rate of not less than 5° C./sec. It is because {111} orientation grains are apt to be formed at an average heating rate of less than 5° C./sec. It is more preferably not less than 10° C./sec, and further preferably not less than 15° C./sec.

In the heating from 700° C. to 760° C., it is preferable to conduct the heating up to the given temperature with a radiation heating being excellent in the uniform heating property. As the radiation heating can be used a well-known heating method such as heating by a radiant tube, heating by an electric heater and the like. Although the heating up to 760° C. may be conducted by using the induction heating, it is necessary to use a large output induction heating facility, so that it is preferable to conduct the heating by combining with the radiant heating.

The reason why the temperature range for defining the average heating rate is set to a range from 600° C. to 700° C. and a range from 700° C. to 760° C. is due to the fact that recrystallization is promoted in the temperature zone from 600° C. to 760° C. and the average heating rate in this temperature zone has a large influence on the magnetic flux density. That is, the recrystallization is not started in a temperature zone of lower than 600° C., while a heating rate in a temperature zone of higher than 760° C. has a small effect on the recrystallization texture.

Moreover, the heating rate in a zone of lower than 600° C. and a zone of higher than 760° C. is not particularly defined. However, it is preferable to be not less than 1° C./sec from a viewpoint of ensuring the productivity.

Also, an annealing atmosphere in the finish annealing is preferably a reducing atmosphere. For example, it is preferable to be a hydrogen-nitrogen mixed atmosphere having $P_{H2O}/P_{H2}$ of not more than 0.1.

The steel sheet after the finish annealing is coated with an insulation coating, if required, to form a product sheet. As the insulation coating can be used a well-known organic coating, inorganic coating or mixture of organic and inorganic coatings in accordance with the required characteristics. For example, it is preferable to apply an organic coating containing a resin for ensuring a good punchability, while it is preferable to apply a semi-organic or an inorganic coating when the weldability is considered important.

Example 1

Each of steel slabs having various chemical compositions A-U shown in Table 1 is reheated to a temperature of 1100° C. for 20 minutes and hot rolled at a finish rolling end temperature of 750° C. and a coiling temperature of 630° C. to form a hot rolled sheet having a sheet thickness of 2.7 mm. The hot rolled sheet is pickled after a hot band annealing or without a hot band annealing and cold rolled to form a cold rolled sheet having a final sheet thickness of 0.5 mm. Here, the steel sheet before the final cold rolling is confirmed to have a recrystallization ratio of 100%.

Next, the cold rolled sheet is subjected to a finish annealing at 920° C. for 10 seconds in a reducing atmosphere with a ratio by vol % of $H_2:N_2$=20:80 and a dew point of 31 40° C. ($P_{H2O}/P_{H2}$=0.001) and then coated with an insulation coating to form a product sheet (non-oriented electrical steel sheet). As shown in FIG. 2, the zone from 500° C. to 740°

C. in the heating process of the finish annealing is conducted by varying an average heating rate within a range of 20-400° C./sec with an induction heating device, while the heating in the other temperature zone is conducted by radiation heating with a radiant tube. Moreover, hot band annealing conditions, a ferrite grain size before the final cold rolling, and an average heating rate from 600° C. to 700° C. in the finish annealing in the above production process are shown in Table 2. An average heating rate from 700° C. to 760° C. is set to 16° C./sec, while an average heating rate of a temperature zone of higher than 760° C. but not higher than a soaking temperature is set to 20° C./sec.

TABLE 1

| Steel symbol | Chemical composition (mass %) | | | | | | | | |
|---|---|---|---|---|---|---|---|---|---|
| | C | P | Si | Mn | Al | Ni | Cr | S | N |
| A | 0.0020 | 0.06 | 1.02 | 0.21 | 0.0005 | 0.01 | 0.01 | 0.0013 | 0.0016 |
| B | 0.0018 | 0.05 | 1.11 | 0.23 | 0.0008 | 0.01 | 0.02 | 0.0016 | 0.0014 |
| C | 0.0019 | 0.04 | 1.08 | 0.22 | 0.0004 | 0.01 | 0.01 | 0.0012 | 0.0016 |
| D | 0.0026 | 0.04 | 0.99 | 0.19 | 0.0006 | 0.02 | 0.02 | 0.0015 | 0.0017 |
| E | 0.0013 | 0.03 | 1.07 | 0.26 | 0.0002 | 0.01 | 0.01 | 0.0012 | 0.0013 |
| F | 0.0011 | 0.06 | 1.09 | 0.22 | 0.0005 | 0.01 | 0.01 | 0.0016 | 0.0015 |
| G | 0.0013 | 0.05 | 0.83 | 0.26 | 0.310 | 0.01 | 0.01 | 0.0011 | 0.0013 |
| H | 0.0031 | 0.01 | 0.51 | 0.24 | 0.0002 | 1.21 | 0.01 | 0.0019 | 0.0021 |
| I | 0.0026 | 0.02 | 0.43 | 0.22 | 0.0003 | 0.01 | 1.51 | 0.0012 | 0.0012 |
| J | 0.0021 | 0.06 | 1.05 | 0.26 | 0.0004 | 0.02 | 0.01 | 0.0063 | 0.0015 |
| K | 0.0016 | 0.02 | 1.13 | 0.24 | 0.0003 | 0.01 | 0.01 | 0.0018 | 0.0058 |
| L | 0.0012 | 0.06 | 1.05 | 0.18 | 0.0002 | 0.01 | 0.01 | 0.0020 | 0.0016 |
| M | 0.0013 | 0.05 | 1.18 | 0.21 | 0.0006 | 0.01 | 0.01 | 0.0018 | 0.0013 |
| N | 0.0019 | 0.05 | 1.13 | 0.24 | 0.0005 | 0.01 | 0.01 | 0.0016 | 0.0020 |
| O | 0.0022 | 0.06 | 1.14 | 0.19 | 0.0003 | 0.01 | 0.01 | 0.0013 | 0.0019 |
| P | 0.0026 | 0.06 | 1.02 | 0.23 | 0.0001 | 0.01 | 0.01 | 0.0016 | 0.0012 |
| Q | 0.0024 | 0.05 | 1.08 | 0.24 | 0.0003 | 0.01 | 0.01 | 0.0008 | 0.0016 |
| R | 0.0014 | 0.04 | 1.13 | 0.21 | 0.0005 | 0.01 | 0.01 | 0.0011 | 0.0013 |
| S | 0.0009 | 0.05 | 1.11 | 0.20 | 0.0007 | 0.01 | 0.01 | 0.0013 | 0.0017 |
| T | 0.0022 | 0.06 | 1.09 | 0.26 | 0.0005 | 0.01 | 0.01 | 0.0020 | 0.0016 |
| U | 0.0017 | 0.06 | 1.07 | 0.25 | 0.0003 | 0.01 | 0.01 | 0.0016 | 0.0014 |
| V | 0.0019 | 0.04 | 1.61 | 0.92 | 0.0002 | 0.02 | 0.04 | 0.0022 | 0.0019 |
| W | 0.0012 | 0.08 | 0.62 | 0.27 | 0.63 | 0.01 | 0.02 | 0.0019 | 0.0016 |

| Steel symbol | Chemical composition (mass %) | | | | | Remarks |
|---|---|---|---|---|---|---|
| | O | Ti | Nb | As | Others | |
| A | 0.0014 | 0.0005 | 0.0004 | 0.001 | — | Inventive steel |
| B | 0.0012 | 0.0006 | 0.0003 | 0.001 | Sn: 0.06 | Inventive steel |
| C | 0.0017 | 0.0008 | 0.0002 | 0.001 | Sb: 0.05 | Inventive steel |
| D | 0.0014 | 0.0004 | 0.0004 | 0.001 | Ca: 0.003 | Inventive steel |
| E | 0.0014 | 0.0007 | 0.0003 | 0.001 | Mg: 0.002 | Inventive steel |
| F | 0.0013 | 0.0006 | 0.0003 | 0.001 | REM: 0.002 | Inventive steel |
| G | 0.0012 | 0.0005 | 0.0002 | 0.001 | — | Inventive steel |
| H | 0.0016 | 0.0007 | 0.0001 | 0.001 | — | Inventive steel |
| I | 0.0016 | 0.0003 | 0.0002 | 0.001 | — | Inventive steel |
| J | 0.0013 | 0.0004 | 0.0003 | 0.001 | — | Comparative steel |
| K | 0.0012 | 0.0006 | 0.0006 | 0.001 | — | Comparative steel |
| L | 0.0061 | 0.0007 | 0.0005 | 0.001 | — | Comparative steel |
| M | 0.0013 | 0.0018 | 0.0006 | 0.001 | — | Inventive steel |
| N | 0.0016 | 0.0027 | 0.0003 | 0.001 | — | Inventive steel |
| O | 0.0014 | 0.0053 | 0.0007 | 0.001 | — | Comparative steel |
| P | 0.0018 | 0.0009 | 0.0015 | 0.001 | — | Inventive steel |
| Q | 0.0015 | 0.0006 | 0.0024 | 0.001 | — | Inventive steel |
| R | 0.0013 | 0.0004 | 0.0039 | 0.001 | — | Comparative steel |
| S | 0.0014 | 0.0005 | 0.0008 | 0.003 | — | Inventive steel |
| T | 0.0012 | 0.0009 | 0.0006 | 0.004 | — | Inventive steel |
| U | 0.0018 | 0.0008 | 0.0004 | 0.006 | — | Comparative steel |
| V | 0.0024 | 0.0009 | 0.0008 | 0.001 | Sn: 0.04, Ca: 0.003 | Inventive steel |
| W | 0.0019 | 0.0012 | 0.0004 | 0.002 | Sb: 0.02, Mg: 0.003 | Inventive steel |

TABLE 2

| Steel sheet № | Steel symbol | Production condition Hot band annealing (° C. × sec) | Ferrite grain size before final cold rolling (μm) | Average heating rate from 600° C. to 700° C. in finish annealing (° C. × sec) | Magnetic properties Magnetic flux density $B_{50}$ (T) | Iron loss $W_{15/50}$ (W/kg) | Remarks |
|---|---|---|---|---|---|---|---|
| 1 | A | Not conducted | 25 | 400 | 1.775 | 3.86 | Inventive Example |
| 2 | | | | 200 | 1.774 | 3.86 | Inventive Example |
| 3 | | | | 100 | 1.771 | 3.93 | Inventive Example |
| 4 | | | | 50 | 1.759 | 4.06 | Inventive Example |
| 5 | | | | 30 | 1.741 | 4.22 | Comparative Example |
| 6 | | 800 × 10 | 36 | 200 | 1.771 | 3.89 | Inventive Example |
| 7 | | 850 × 10 | 45 | 200 | 1.772 | 3.91 | Inventive Example |
| 8 | | 930 × 10 | 61 | 200 | 1.773 | 3.82 | Inventive Example |
| 9 | | 1000 × 10 | 95 | 200 | 1.775 | 3.81 | Inventive Example |
| 10 | | 800 × 10 | 36 | 30 | 1.746 | 4.15 | Comparative Example |
| 11 | | 850 × 10 | 45 | 30 | 1.751 | 4.07 | Comparative Example |
| 12 | | 930 × 10 | 61 | 30 | 1.759 | 4.02 | Comparative Example |
| 13 | | 1000 × 10 | 95 | 30 | 1.765 | 3.93 | Comparative Example |
| 14 | B | Not conducted | 22 | 20 | 1.752 | 4.13 | Comparative Example |
| 15 | | | | 200 | 1.782 | 3.81 | Inventive Example |
| 16 | C | 860 × 10 | 43 | 20 | 1.762 | 4.02 | Comparative Example |
| 17 | | | | 200 | 1.785 | 3.76 | Inventive Example |
| 18 | D | Not conducted | 29 | 20 | 1.743 | 3.92 | Comparative Example |
| 19 | | | | 200 | 1.772 | 3.73 | Inventive Example |
| 20 | E | 800 × 10 | 38 | 20 | 1.749 | 3.95 | Comparative Example |
| 21 | | | | 200 | 1.771 | 3.72 | Inventive Example |
| 22 | F | Not conducted | 30 | 20 | 1.743 | 4.05 | Inventive Example |
| 23 | | | | 200 | 1.769 | 3.76 | Inventive Example |
| 24 | G | Not conducted | 27 | 20 | 1.729 | 4.26 | Comparative Example |
| 25 | | | | 200 | 1.763 | 3.88 | Inventive Example |
| 26 | H | 830 × 10 | 34 | 20 | 1.735 | 4.02 | Comparative Example |
| 27 | | | | 200 | 1.764 | 3.76 | Inventive Example |
| 28 | I | Not conducted | 22 | 20 | 1.724 | 4.03 | Comparative Example |
| 29 | | | | 200 | 1.762 | 3.76 | Inventive Example |
| 30 | J | Not conducted | 20 | 20 | 1.743 | 4.72 | Comparative Example |
| 31 | | | | 200 | 1.745 | 4.68 | Comparative Example |
| 32 | K | Not conducted | 19 | 20 | 1.742 | 4.65 | Comparative Example |
| 33 | | | | 200 | 1.743 | 4.64 | Comparative Example |
| 34 | L | Not conducted | 21 | 20 | 1.744 | 4.63 | Comparative Example |
| 35 | | | | 200 | 1.746 | 4.59 | Comparative Example |
| 36 | M | Not conducted | 20 | 20 | 1.739 | 4.26 | Comparative Example |
| 37 | | | | 200 | 1.774 | 3.89 | Inventive Example |
| 38 | N | Not conducted | 19 | 20 | 1.738 | 4.27 | Comparative Example |
| 39 | | | | 200 | 1.765 | 4.03 | Inventive Example |
| 40 | O | Not conducted | 19 | 20 | 1.736 | 4.29 | Comparative Example |
| 41 | | | | 200 | 1.742 | 4.28 | Comparative Example |
| 42 | P | 850 × 10 | 43 | 20 | 1.750 | 4.09 | Comparative Example |
| 43 | | | | 200 | 1.771 | 3.92 | Inventive Example |
| 44 | Q | 850 × 10 | 42 | 20 | 1.749 | 4.11 | Comparative Example |
| 45 | | | | 200 | 1.761 | 4.13 | Inventive Example |
| 46 | R | 850 × 10 | 40 | 20 | 1.741 | 4.42 | Comparative Example |
| 47 | | | | 200 | 1.743 | 4.36 | Comparative Example |
| 48 | S | Not conducted | 20 | 20 | 1.738 | 4.25 | Comparative Example |
| 49 | | | | 200 | 1.775 | 3.83 | Inventive Example |
| 50 | T | Not conducted | 18 | 20 | 1.736 | 4.26 | Comparative Example |
| 51 | | | | 200 | 1.762 | 4.03 | Inventive Example |
| 52 | U | Not conducted | 22 | 20 | 1.736 | 4.26 | Comparative Example |
| 53 | | | | 200 | 1.742 | 4.28 | Comparative Example |

From the thus obtained product sheet are taken out test specimens of 280 mm×30 mm in L direction and C direction as a longitudinal direction to measure magnetic properties (iron loss $W_{15/50}$ and magnetic flux density $B_{50}$) by an Epstein test. The measurement results are also shown in Table 2.

As seen from Table 2, all of the non-oriented electrical steel sheets produced by using a raw steel material having a chemical composition adapted to the invention under a condition adapted to the invention have excellent magnetic properties with compared to steel sheets having the same chemical composition and produced under the same hot band annealing condition. In particular, it can be seen that the magnetic flux density $B_{50}$ is largely increased by the rapid heating in the steel sheet having a ferrite grain size before the final cold rolling controlled to not more than 70

μm. In the invention, the decrease of the magnetic flux density is small even when the hot band annealing temperature is lowered, so that economical merits such as improvement of the productivity and decrease of annealing cost can be obtained.

Example 2

Each of steel slabs having 2 kinds of chemical compositions V and W shown in Table 1 is reheated to a temperature of 1120° C. for 30 minutes and hot rolled by varying a finish rolling end temperature and a coiling temperature to form a hot rolled sheet having a sheet thickness of 2.0 mm. The hot rolled sheet is pickled and cold rolled to obtain a cold rolled sheet having a final sheet thickness of 0.35 mm. Moreover, the steel sheet before the final cold rolling is confirmed to have a recrystallization ratio of 100%.

Figure 4:
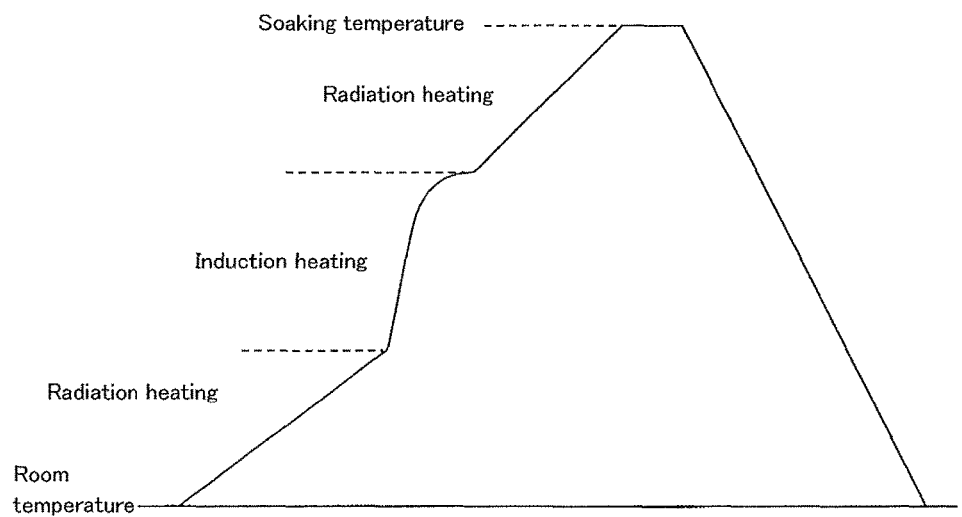
FIG. 4 is a diagram explaining a heating pattern in a finish annealing for an example.

Next, the cold rolled sheet is subjected to a finish annealing at 950° C. for 10 seconds in a reducing atmosphere with a ratio by vol % of $H_2:N_2=20:80$ and a dew point of −40° C. ($P_{H2O}/P_{H2}=0.001$) and then coated with an insulation coating to form a product sheet (non-oriented electrical steel sheet). As shown in FIG. 4, the heating process from 200° C. to 740° C. in the finish annealing is conducted by varying an average heating rate within a range of 20-400° C./sec through an induction heating, while the heating process in the other temperature zone is conducted by a radiation heating with a radiant tube. The average heating rate in a temperature zone higher than 760° C. is controlled to 20° C./sec. Moreover, the hot rolling conditions, ferrite grain size before the final cold rolling, and average heating rate from 600° C. to 700° C. and average heating rate from 700° C. to 760° C. in the finish annealing in the production process are shown in Table 3 together.

From the thus obtained product sheet are taken out test specimens of 280 mm×30 mm in L direction and C direction as a longitudinal direction to measure magnetic properties (iron loss $W_{15/50}$ and magnetic flux density $B_{50}$) by an Epstein test. The measurement results are also shown in Table 3.

As seen from Table 3, all of the non-oriented electrical steel sheets produced by using a raw steel material having a chemical composition adapted to the invention under conditions adapted to the invention have excellent magnetic properties. In particular, it can be seen that the magnetic flux density $B_{50}$ is largely increased by the rapid heating in the steel sheet having a ferrite grain size before the final cold rolling controlled to not more than 70 μm. In the invention, the decrease of the magnetic flux density is small even when the finish rolling end temperature and the coiling temperature are lowered, so that economical merits such as improvement of the productivity and the like can be obtained.

The invention claimed is:

1. A method for producing a non-oriented electrical steel sheet by hot rolling a steel slab having a chemical composition comprising C: not more than 0.005 mass %, Si: not more than 8.0 mass %, Mn: 0.03-3.0 mass %, P: not more than 0.2 mass %, S: not more than 0.005 mass %, Al: not more than 3.0 mass %, N: not more than 0.005 mass %, Ni: not more than 3 mass % and not less than 0.01 mass %, Cr: not more than 5 mass % and not less than 0.01 mass %, Ti: not more than 0.005 mass %, Nb: not more than 0.003 mass %, As: not more than 0.005 mass %, O: not more than 0.005 mass % and the remainder being Fe and inevitable impurities, subjecting to one cold rolling or two or more cold rollings interposing an intermediate annealing therebetween after a hot band annealing or without a hot band annealing,

TABLE 3

| Steel sheet № | Steel symbol | Hot rolling condition Finish rolling end temperature (° C.) | Hot rolling condition Coiling temperature (° C.) | Ferrite grain size before final cold rolling (μm) | Finish annealing Average heating rate from 600° C. to 700° C. (° C. × sec) | Finish annealing Average heating rate from 700° C. to 760° C. (° C. × sec) | Magnetic properties Magnetic flux density $B_{50}$ (T) | Magnetic properties Iron loss $W_{15/50}$ (W/kg) | Remarks |
|---|---|---|---|---|---|---|---|---|---|
| 1 | V | 820 | 580 | 23 | 20 | 20 | 1.712 | 2.83 | Comparative Example |
| 2 | V | 820 | 580 | 23 | 200 | 20 | 1.746 | 2.61 | Inventive Example |
| 3 | V | 820 | 580 | 23 | 200 | 16 | 1.744 | 2.63 | Inventive Example |
| 4 | V | 820 | 580 | 23 | 200 | 12 | 1.738 | 2.68 | Inventive Example |
| 5 | V | 820 | 580 | 23 | 200 | 8 | 1.726 | 2.72 | Inventive Example |
| 6 | V | 820 | 580 | 23 | 200 | 4 | 1.719 | 2.78 | Inventive Example |
| 7 | V | 930 | 620 | 45 | 20 | 20 | 1.718 | 2.78 | Comparative Example |
| 8 | V | 930 | 620 | 45 | 200 | 20 | 1.748 | 2.59 | Inventive Example |
| 9 | V | 860 | 760 | 62 | 20 | 20 | 1.727 | 2.73 | Comparative Example |
| 10 | V | 860 | 760 | 62 | 200 | 20 | 1.749 | 2.58 | Inventive Example |
| 11 | V | 960 | 860 | 89 | 20 | 20 | 1.739 | 2.66 | Comparative Example |
| 12 | V | 960 | 860 | 89 | 200 | 20 | 1.752 | 2.56 | Inventive Example |
| 13 | W | 830 | 590 | 29 | 20 | 20 | 1.713 | 3.32 | Comparative Example |
| 14 | W | 830 | 590 | 28 | 200 | 20 | 1.745 | 3.13 | Inventive Example |
| 15 | W | 830 | 590 | 28 | 200 | 16 | 1.743 | 3.15 | Inventive Example |
| 16 | W | 830 | 590 | 28 | 200 | 12 | 1.737 | 3.16 | Inventive Example |
| 17 | W | 830 | 590 | 28 | 200 | 8 | 1.727 | 3.23 | Inventive Example |
| 18 | W | 830 | 590 | 28 | 200 | 4 | 1.720 | 3.26 | Inventive Example |
| 19 | W | 950 | 640 | 48 | 20 | 20 | 1.719 | 3.28 | Comparative Example |
| 20 | W | 950 | 640 | 48 | 200 | 20 | 1.747 | 3.10 | Inventive Example |
| 21 | W | 850 | 750 | 66 | 20 | 20 | 1.725 | 3.25 | Comparative Example |
| 22 | W | 850 | 750 | 66 | 200 | 20 | 1.748 | 3.08 | Inventive Example |
| 23 | W | 950 | 880 | 92 | 20 | 20 | 1.738 | 3.18 | Comparative Example | and further to a finish annealing, wherein an average heating rate from 600° C. to 700° C., during the heating process through induction heating in the finish annealing, is set to not less than 50° C./sec, and wherein the heating process in the finish annealing is conducted, by heating through radiation heating subsequent to the induction heating, to set an average heating rate from 700° C. to 760° C. to 5-24° C./sec.

2. The method for producing a non-oriented electrical steel sheet according to claim 1, wherein a ferrite grain size before a final cold rolling in the cold rolling is set to not more than 70 μm.

3. The method for producing a non-oriented electrical steel sheet according to claim 1, wherein the steel slab contains one or two of Sn and Sb each in an amount of 0.005-0.20 mass % in addition to the chemical composition.

4. The method for producing a non-oriented electrical steel sheet according to claim 2, wherein the steel slab contains one or two of Sn and Sb each in an amount of 0.005-0.20 mass % in addition to the chemical composition.

5. The method for producing a non-oriented electrical steel sheet according to claim 1, wherein the steel slab contains one or more selected from Ca, Mg, and REM each in an amount of 0.0001-0.010 mass % in addition to the chemical composition.

6. The method for producing a non-oriented electrical steel sheet according to claim 2, wherein the steel slab contains one or more selected from Ca, Mg, and REM each in an amount of 0.0001-0.010 mass % in addition to the chemical composition.

7. The method for producing a non-oriented electrical steel sheet according to claim 3, wherein the steel slab contains one or more selected from Ca, Mg, and REM each in an amount of 0.0001-0.010 mass % in addition to the chemical composition.

8. The method for producing a non-oriented electrical steel sheet according to claim 4, wherein the steel slab contains one or more selected from Ca, Mg, and REM each in an amount of 0.0001-0.010 mass % in addition to the chemical composition.

* * * * *